(12) United States Patent
Cho

(10) Patent No.: US 9,916,049 B2
(45) Date of Patent: Mar. 13, 2018

(54) TOUCH SENSING SYSTEM AND DISPLAY APPARATUS

(71) Applicant: LG DISPLAY CO., LTD., Seoul (KR)

(72) Inventor: Ji-Ho Cho, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 33 days.

(21) Appl. No.: 14/460,992

(22) Filed: Aug. 15, 2014

(65) Prior Publication Data

US 2015/0103039 A1 Apr. 16, 2015

(30) Foreign Application Priority Data

Oct. 15, 2013 (KR) ......................... 10-2013-0122328

(51) Int. Cl.
*G06F 3/044* (2006.01)
*G06F 3/041* (2006.01)
*G06F 3/046* (2006.01)
*G06F 3/0354* (2013.01)

(52) U.S. Cl.
CPC .......... *G06F 3/044* (2013.01); *G06F 3/03545* (2013.01); *G06F 3/046* (2013.01); *G06F 3/0414* (2013.01); *G06F 3/0416* (2013.01); *G06F 2203/04106* (2013.01)

(58) Field of Classification Search
CPC .... G06F 3/044; G06F 3/0414; G06F 3/03545; G06F 3/046; G06F 3/0416; G06F 2203/04106
See application file for complete search history.

(56) References Cited

U.S. PATENT DOCUMENTS

| 5,905,489 A | * | 5/1999 | Takahama | G06F 3/044 345/156 |
| 6,417,846 B1 | * | 7/2002 | Lee | G06F 3/03545 178/18.01 |
| 2002/0036622 A1 | * | 3/2002 | Jaeger | G06F 3/03545 345/173 |
| 2006/0262106 A1 | * | 11/2006 | Suk | G06F 1/1626 345/179 |
| 2007/0227785 A1 | * | 10/2007 | Katsurahira | G06F 1/32 178/18.07 |
| 2008/0150918 A1 | * | 6/2008 | Hagen | G06F 3/03545 345/179 |

(Continued)

FOREIGN PATENT DOCUMENTS

| CN | 101042626 A | 9/2007 |
| CN | 102253774 A | 11/2011 |

(Continued)

*Primary Examiner* — Amare Mengistu
*Assistant Examiner* — Jennifer Zubajlo
(74) *Attorney, Agent, or Firm* — Birch, Stewart, Kolasch & Birch, LLP

(57) ABSTRACT

The present disclosure is related to a touch sensing system and a display apparatus including: a touch screen panel defining sensor nodes by first lines and second lines formed in crossing directions, a loop type antenna, and a touch processor that performs a first touch process by receiving a signal with respect to driving pulses applied to each of the first lines and the second lines, through the antenna, and performs a second touch process by sequentially applying the driving pulses to each of two or more selected lines among the first lines and the second lines and by receiving a signal through the antenna.

15 Claims, 15 Drawing Sheets

(56) References Cited

U.S. PATENT DOCUMENTS

| | | | | |
|---|---|---|---|---|
| 2011/0068776 A1* | 3/2011 | Yokota | ............... | G06F 3/0416 324/207.11 |
| 2011/0069022 A1* | 3/2011 | Yokota | ............... | G06F 3/0416 345/173 |
| 2011/0095990 A1* | 4/2011 | Philipp | ............... | G06F 3/044 345/173 |
| 2011/0216032 A1* | 9/2011 | Oda | ............... | G06F 3/044 345/174 |
| 2013/0076670 A1* | 3/2013 | Wu | ............... | G06F 3/044 345/173 |
| 2013/0207925 A1* | 8/2013 | Ryshtun | ............... | G06F 3/0416 345/174 |
| 2014/0104224 A1* | 4/2014 | Ih | ............... | G06F 3/044 345/174 |
| 2014/0206982 A1 | 7/2014 | Schmidt | | |
| 2015/0049049 A1* | 2/2015 | Kim | ............... | G06F 3/044 345/174 |
| 2015/0084899 A1* | 3/2015 | Park | ............... | G06F 3/03545 345/173 |
| 2015/0091856 A1* | 4/2015 | Park | ............... | G06F 3/0416 345/174 |
| 2015/0123940 A1* | 5/2015 | Park | ............... | G06F 3/0416 345/174 |
| 2015/0226871 A1* | 8/2015 | Ludden | ............... | G01V 3/08 324/676 |

FOREIGN PATENT DOCUMENTS

| | | |
|---|---|---|
| EP | 2629183 A2 | 8/2013 |
| JP | 2006-163798 A | 6/2006 |
| JP | 2007-257359 A | 10/2007 |
| JP | 2008-152640 A | 7/2008 |
| JP | 2011-65614 A | 3/2011 |
| JP | 2014-142342 A | 8/2014 |
| KR | 10-2011-0057385 A | 6/2011 |

\* cited by examiner

*FIG.4*

| TOUCH MODE | DRIVING LINE (Tx) | SENSING LINE (Rx) |
|---|---|---|
| FINGER TOUCH MODE (MODE=1) | L1 (OR L2) | L2 (OR L1) |
| PEN TOUCH MODE (MODE=2) | L1 & L2 | ANT |

TOUCH SENSING SYSTEM AND DISPLAY APPARATUS

CROSS-REFERENCE TO RELATED APPLICATION

This application claims priority from and the benefit under 35 U.S.C. § 119(a) of Korean Patent Application No. 10-2013-0122328, filed on Oct. 15, 2013, which is hereby incorporated by reference for all purposes as if fully set forth herein.

BACKGROUND OF THE INVENTION

1. Field of the Invention

The present invention relates to a touch sensing system and a display apparatus.

2. Description of the Related Art

With the development of information society, various types of requirements for a display apparatus for displaying an image are increasing, and recently, various display apparatuses, such as a Liquid Crystal Display (LCD) apparatus, a Plasma Display Panel (PDP), and an Organic Light Emitting Diode (OLED) display apparatus, are being used.

The display apparatus provides an input method based on a touch that enables a user to input information or an instruction easily, directly and conveniently, getting away from a usual input methods such as a button, a keyboard, a mouse, etc.

In order to provide the touch based method, a touch sensing system capable of accurately detecting a coordinate of a point where the user touches is necessary.

In the conventional touch sensing system, various touch sensing methods are used. Among these, a capacitance method for sensing a touch by sensing a change of a capacitance when a body or a specific object is contacted with the touch sensing system is being used a lot. In addition, an electromagnetic inducement method is being used in order to enable the user to accurately input by using a pen and so on.

All of the capacitance method and the electromagnetic inducement method, which are different touch sensing methods, should be provided so that the conventional touch sensing system provides all of a finger touch mode and a pen touch mode (i.e., separate structures such as panels and so on) for each of the capacitance method and the electromagnetic inducement method are required. Thus, the size of a display apparatus including the conventional touch sensing system is large.

In addition, the conventional touch sensing system may not effectively provide the capacitance method and the electromagnetic inducement method, which are different touch sensing methods, and thus a time for a touch sensing (specially, a touch sensing in a pen touch mode) increases or a calculation amount and a memory space increase.

SUMMARY OF THE INVENTION

An aspect of the present invention is to provide a touch sensing system and a display apparatus capable of effectively sensing a touch at high speed.

Another aspect of the present invention is to provide a combined shape of a touch sensing structure for effectively providing different kinds of touch modes, without inclusion of an additional touch sensing structure according to each of the different kinds of the touch modes, such as a finger touch mode and a pen touch mode, and a touch sensing system and a display apparatus performing a sensing driving by using the combined shape of touch sensing structure.

Further another aspect of the present invention is to provide a touch sensing system and a display apparatus supporting a pen touch mode in which a capacitance method and an electromagnetic inducement method are combined.

Further another aspect of the present invention is to provide a touch sensing system and a display apparatus capable of sensing (specially, a pen touch sensing) a touch at high speed, and decreasing a calculation amount and a memory space for a touch sensing.

Further another aspect of the present invention is to provide a touch sensing system and a display apparatus capable of quickly detecting a pressure of a pen touching a screen in a pen touch mode, and increasing an accuracy of a pressure detection result.

In accordance with an aspect of the present invention, there is provided a touch sensing system including: a touch screen panel that defines sensor nodes by the first lines and the second lines formed in crossing directions; an antenna of a loop shape; and a touch processor that detects a coordinate of a point where a pen touches a screen, by sensing the sensor nodes through a sequential driving of the first lines and the second lines and a reception of a resonance signal of the pen touching the screen through the antenna, and detects a pressure of the pen touching the screen, by sensing only a portion of the sensor nodes among the sensor nodes through a sequential driving of a main line corresponding to the detected coordinate among the first lines and the second lines and an adjacent line adjacent to the main line and the reception of the resonance signal of the pen through the antenna.

In accordance with another aspect of the present invention, there is provided a touch sensing system including: a touch screen panel including first lines and second lines formed in crossing directions; an antenna of a loop shape; and a touch processor that performs a first touch process by receiving a signal with respect to driving pulses applied to each of the first lines and the second lines, through the antenna, and performs a second touch process by sequentially applying the driving pulses to each of two or more selected lines among the first lines and the second lines and by receiving the signal through the antenna.

In accordance with further another aspect of the present invention, there is provided a touch sensing system including: a touch screen panel including first lines and second lines formed in crossing directions; an antenna of a loop shape; and a touch processor that senses a touch on a screen based on a signal received through a sensing line by applying a driving pulse through a driving line, when a touch mode is a first touch mode, according to a kind of the touch mode, controls to operate one of the first lines and the second lines as the driving line and operate another of the first lines and the second lines as the sensing line, and when the touch mode is a second touch mode, according to a kind of the touch mode, controls to operate both of the first lines and the second lines as the driving line and operate the antenna as the sensing line.

In accordance with further another aspect of the present invention, there is provided a display apparatus including: a display panel; a touch sensor including first lines and second lines formed in crossing directions, and an antenna formed in a peripheral area of the first lines and the second lines; and a touch processor that performs a first touch process by receiving a signal with respect to driving pulses applied to each of the first lines and the second lines, through the antenna, and performs a second touch process by sequentially applying the driving pulses to each of two or more selected lines among the first lines and the second lines and by receiving the signal through the antenna.

As described above, according to the present invention, there is an effect of providing a touch sensing system and a display apparatus capable of effectively sensing the touch at high speed.

In addition, according to the present invention, there is an effect of providing a combined shape of touch sensing structure for effectively providing different kinds of touch modes, without inclusion of an additional touch sensing structure according to each of the different kinds of the touch modes such as a finger touch mode and a pen touch mode, and a touch sensing system and a display apparatus performing a sensing driving by using the combined shape of touch sensing structure.

In addition, according to the present invention, there is an effect of providing a touch sensing system and a display apparatus, which supports a pen touch mode, in which a capacitance method and an electromagnetic inducement method are combined.

In addition, according to the present invention, there is an effect of providing a touch sensing system and a display apparatus capable of sensing (specially, a pen touch sensing) a touch at high speed, and decreasing a calculation amount and a memory space for a touch sensing.

In addition, according to the present invention, there is an effect of providing a touch sensing system and a display apparatus, which is capable of quickly detecting a pressure of a pen touching a screen in a pen touch mode, and increasing an accuracy of a pressure detection result.

BRIEF DESCRIPTION OF THE DRAWINGS

The above and other objects, features and advantages of the present invention will be more apparent from the following detailed description taken in conjunction with the accompanying drawings, in which:

FIG. 4 is a view illustrating a touch sensor according to each of touch modes of the touch sensing system according to an embodiment of the present invention;

DETAILED DESCRIPTION OF THE EMBODIMENTS

Figure 1:
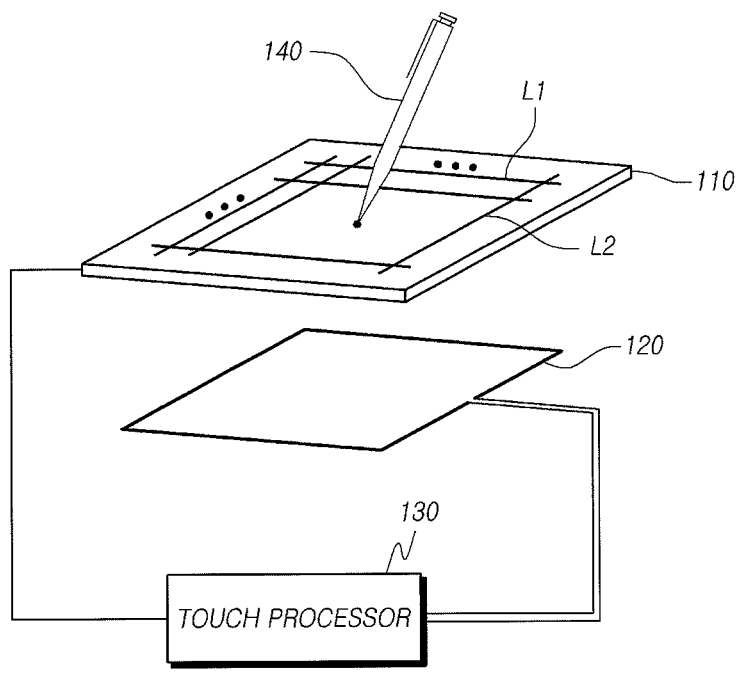
FIG. 1 is a view schematically illustrating a touch sensing system according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a view schematically illustrating a touch sensing system 100 according to an exemplary embodiment. All the components of the touch sensing system of the present invention are operatively coupled and configured.

Referring to FIG. 1, the touch sensing system 100 according to an exemplary embodiment, is a system for sensing a touch by detecting a touch coordinate, a touch pressure and so on, when a pointer such as a pen 140, a finger and so on touches a screen. The touch sensing system 100 includes a Touch Screen Panel (TSP) 110 where a touch sensor for sensing a touch is formed, a touch processor 130 performing a touch process by detecting a coordinate where the pointer touches the screen and a pressure of the pointer touching the screen and so on by using information received through the touch sensor, etc. The touch sensing system 100 may further include the pen 140 operating as the pointer in a pen touch mode, an antenna 120 receiving a signal from the pen 140, and so on.

The touch sensing system 100 according to an exemplary embodiment supports two kinds of touch modes including a finger touch mode and the pen touch mode. The touch sensing system 100 supports the finger touch mode in a capacitance method, and supports the pen touch mode in a new method in which the capacitance method and an electromagnetic inducement method are combined.

To this end, the touch sensing system 100 according to an exemplary embodiment has two kinds of touch sensors.

As the first touch sensor, first lines L1 and second lines L2 formed in crossing directions are included in a touch screen panel 110. The first lines L1 and the second lines L2 are operated as a driving line and a sensing line, respectively, in the finger touch mode, and are operated as only the driving line in the pen touch mode.

The first lines L1 and the second lines L2 may be formed on two layers in the touch screen panel 110, respectively. Alternatively, the first lines L1 and the second lines L2 may be formed together on a single layer in the touch screen panel 110.

As the second touch sensor, the antenna 120 is disposed (i.e., formed) in a loop shape in a peripheral area of the first lines L1 and the second lines L2. The antenna 120 is a touch sensor operated as the sensing line in the pen touch mode.

In case of the pen touch mode, driving pulses are sequentially provided to each of the first lines L1 and the second lines L2 operated as the driving line. When each of the driving pulses are provided, a capacitor is formed between the pen 140 touching the screen and the corresponding line (one line of the first and second lines L1 and L2). Therefore, an alternating current (AC) power corresponding to the driving pulse is transferred to the pen 140, a resonance signal is generated in a resonance circuit in the pen 140, and the resonance signal is received to the antenna 120. The resonance signal received to the antenna 120 is used in detecting the coordinate where the pen 140 touches the screen, the pressure of the pen touching the screen, etc. In this respect, the antenna 120 may be referred to as one kind of the touch sensor operated as the sensing line in the pen touch mode.

For example, the antenna 120 may be disposed in the touch screen panel 110, and may be disposed in an edge area of the touch screen panel 110.

In this case, all of the first lines, the second lines and the antenna 120 are formed (i.e., disposed) in the touch screen panel 110.

The touch screen panel 110 may support the finger touch mode in the capacitance method by using the touch sensor of the first lines and the second lines. In addition, the touch screen panel 110 may support the pen touch mode in the method in which the capacitance method and the electromagnetic inducement method are combined by further using the antenna 120 as the touch sensor in addition to the first lines and the second lines.

A touch sensing structure and a sensing driving method of the touch screen panel 110 and so on, for supporting the pen touch mode in the method in which the capacitance method and the electromagnetic inducement method are combined by further using the antenna 120 as the touch sensor in addition to the first lines and the second lines, will be described in detail later.

The touch sensing system 100 according to an exemplary embodiment includes a touch sensing structure such as the touch screen panel 110 having a combined type for effectively providing different kinds of touch modes, without inclusion of a touch sensing structure such as a touch screen panel according to each of the different kinds of the touch modes such as the finger touch mode and the pen touch mode. The touch sensing system 100 provides a sensing driving method by using the touch screen panel 110.

Meanwhile, with related to a position of the antenna 120, the antenna 120 may be disposed so that the antenna 120 surrounds the first lines L1 and the second lines L2 in the outside of the touch screen panel 110, in consideration of a design space and so on.

The above-mentioned touch processor 130 senses the touch on the screen based on the signal received through the sensing line by applying the driving pulse through the driving line. The touch processor 130 may control the first lines L1 and the second lines L2 so that one of the first lines L1 and the second lines L2 is operated as the driving line and another of the first lines L1 and the second lines L2 is operated as the sensing line, when the touch mode is the first touch mode (e.g., the finger touch mode), according to the kind of the touch mode. In addition, the touch processor 130 may control the first lines L1, the second lines L2 and the antenna so that all of the first lines L1 and the second lines L2 are operated as the driving line and the antenna 120 is operated as the sensing line, when the touch mode is the second touch mode (e.g., the pen touch mode).

Here, the driving line is a line where the driving pulse is applied. The driving line may be referred to as a driving electrode, a Transmission (Tx) line or a Tx electrode. The sensing line is a line where a capacitance for the touch sensing is detected or a signal (i.e., an antenna reception signal) for the touch sensing is received. The sensing line may be referred to as a reception (Rx) line (in case of the finger touch mode, may be referred to as a sensing electrode or an Rx electrode).

The touch sensing system 100 shown in FIG. 1 may be included in a display apparatus such as a Liquid Crystal Display (LCD) apparatus, an Organic Light Emitting Diode (OLED) display apparatus, a Plasma Display Panel (PDP), etc.

In this case, the touch screen panel 110 may be attached on a display panel included in the display apparatus in an add-on type. Alternatively, the touch screen panel 110 may be included in the display panel in an on-cell type or an in-cell type.

Figure 2:
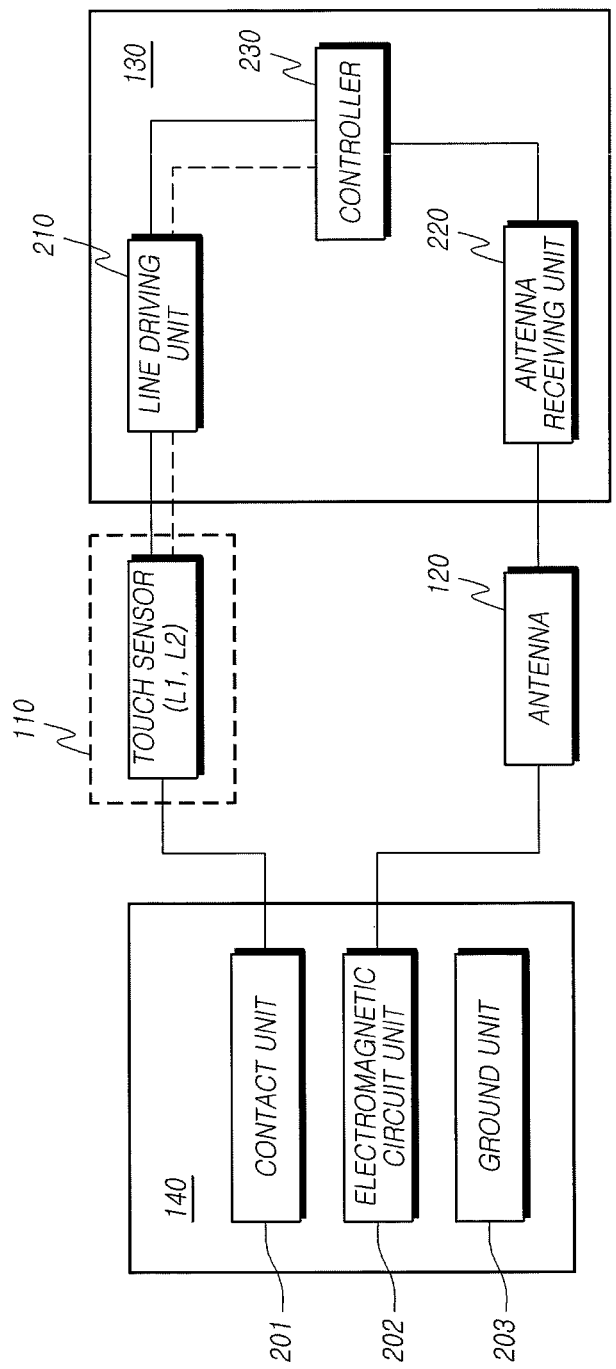
FIG. 2 is a view illustrating the touch sensing system according to an embodiment of the present invention in more detail.

FIG. 2 is a view illustrating the touch sensing system 100 according to an exemplary embodiment in more detail.

Referring to FIG. 2, the touch processor 130 includes a line driving unit 210 driving a driving line corresponding to the kind of the touch mode, an antenna receiving unit 220 receiving a signal through the antenna 120 in the pen touch mode, a controller 230 controlling the line driving unit 210 and the antenna receiving unit 220 and so on and performing a touch process for sensing the touch, etc. Here, the touch processor 130 may be located on a Printed Circuit Board (PCB) connected to the touch screen panel 110.

Referring to FIG. 2, when the touch mode is the finger touch mode, the line driving unit 210 may provide the driving pulse to each of the first lines (may also be second lines) as the driving line among the first lines L1 and the second lines L2 through a Tx channel, and may detect a voltage through a channel connected to the second lines (may also be the first lines) as the sensing line among the first lines L1 and the second lines L2, under a control of the controller 230. The detected voltage is converted into a digital data through a sampling process in the line driving unit 210 or the controller 230, and thus the coordinate of the point where the finger touches the screen may be detected.

Referring to FIG. 2, when the touch mode is the pen touch mode, the line driving unit 210 provides the driving pulse to each of the first lines L1 and the second lines L2 operated as the driving line through the Tx channel, under the control of the controller 230. The antenna receiving unit 220 receives the resonance signal generated from the pen 140 according to a provision of the driving pulse to each of the driving lines by the line driving unit 210.

In addition, referring to FIG. 2, when the touch mode is the pen touch mode, the controller 230 in the touch processor 130 may perform a first touch process by receiving the signal through the antenna 120 with respect to the driving pulse applied to each of the first lines L1 and the second lines L2 formed in the touch screen panel 110, and then may perform a second touch process by sequentially applying the driving pulses to two or more lines selected among the first lines L1 and the second lines L2 formed in the touch screen panel 110 and receiving the signal through the antenna 120.

For example, the first touch process may be a process for detecting the coordinate of the point where the pen 140 touches the screen, and the second touch process may be a process for detecting the pressure (may be referred to a pen pressure) of the pen 140 touching the screen. That is, the controller 230 may detect the coordinate by sensing all sensing nodes, and may detect the pressure by sensing the sensing node where the coordinate is detected and a partial sensing node adjacent to the sensing node where the coordinate is detected.

For another example, the first touch process may be a process for detecting the pressure of the pen 140 touching the screen, and the second touch process may be a process for detecting the coordinate of the point where the pen 140 touches the screen. That is, the controller 230 may detect the pressure by sensing all of the sensing nodes, and may detect the coordinate by sensing the sensing node where the pressure is detected and a partial sensing node adjacent to the sensing node where the pressure is detected.

For example, the above-mentioned touch processor 130 may be implemented as an Integrated Circuit (IC) or an IC chip.

The pen 140 operated in relation to the touch processor 130 in the pen touch mode, as a kind of a touch input apparatus, includes a contact unit 201, an electromagnetic circuit unit 202, a ground unit 203 and so on, as shown in FIG. 2.

The contact unit 201 included in the pen 140 directly contacts with the touch screen panel 110, and includes a conductivity tip.

When the contact unit 201 directly contacts with the touch screen panel 110, the touch screen panel 110 provides the AC power (i.e., the driving pulse) of a squarewave form to the electrode (the first lines and/or the second lines) formed in the touch screen panel 110, and thus the contact unit 201 may form a capacitor with the electrode (the first lines and/or the second lines) of the touch screen panel 110. Here, the capacitor may be formed with two electrode plates and an insulating material between the electrode plates. The conductivity tip of the contact unit 201 and the electrode (i.e., the first lines and/or the second lines) of the touch screen panel 110 may form the two electrode plates of the capacitor, and a material (e.g., a glass film or an air of the touch screen panel 110) between the conductivity tip and the electrode may be the insulating material.

The contact unit 201 may receive the driving pulse output to the electrodes (the first lines and/or the second lines) of the touch screen panel 110 while forming the capacitor with the touch screen panel 110. The driving pulse flows through the electromagnetic circuit unit 202 and the ground unit 203.

The electromagnetic circuit unit 202 including the pen 140 converts the driving pulse transferred through the contact unit 201 into an electromagnetic signal (e.g., a magnetic signal) according to an electromagnetic inducement and transmits the electromagnetic signal to the touch screen panel 110.

The electromagnetic circuit unit 202 may induce the electromagnetic signal by using a coil. According to Faraday's law, an electromotive force may be formed in a circuit in proportion to a time change rate of a magnetic field passing through the circuit, and inversely, when a current flows through the circuit, the magnetic field passing through the circuit may be formed.

The electromagnetic circuit unit 202 may form the magnetic field by an alternating current (AC) flowing to the coil included in the electromagnetic circuit unit 202, the magnetic field is transferred to the antenna 120, and thus the touch processor 130 may perform the touch process to sense the touch.

The ground unit 203 included in the pen 140 forms a path for the AC power. The ground unit 203 may form a closed circuit with the touch screen panel 110 through a user's body. Alternatively, the ground unit 203 may form the closed circuit with the touch screen panel 110 through an additional line connected to the touch screen panel 110. As described above, the ground unit 203 forms the closed circuit connected to the touch screen panel 110, and thus the path through which the AC power input through the contact unit 201 flows to the touch screen panel 110 again is formed.

The touch processor 130 in the case wherein the above-mentioned pen 140 touches the screen, that is, in the pen touch mode, is described in more detail.

The touch processor 130 detects the coordinate of the point where the pen 140 touches the screen by sensing the sensor nodes through the sequential driving of the first lines L1 and the second lines L2 and the reception of the resonance signal of the pen 140 touching the screen through the antenna 120. In addition, the touch processor 130 detects the pressure of the pen 140 touching the screen by sensing only the partial sensor nodes among the sensor nodes through a sequential driving of a main line corresponding to the detected coordinate among the first lines L1 and the second lines L2 and an adjacent line adjacent to the main line and the reception of the resonance signal of the pen 140 through the antenna 120.

Hereinafter, a method for detecting the coordinate and a method for detecting the pressure according to an embodiment of the present invention are described, respectively.

First, in relation to the coordinate detection, the touch processor 130 may control to receive the resonance signal generated from the pen 140 touching the screen as a coordinate detecting reception signal through the antenna 120 because the driving pulses are sequentially applied to each of the first lines L1 and the second lines L2, and then may detect the coordinate of the point where the pen 140 touches the screen by sensing the sensor nodes based on the coordinate detecting reception signal received through the antenna 120.

The touch processor 130 may compare a signal strength of the coordinate detecting reception signal received through the antenna 120 to detect the coordinate (x,y) of the point where the pen 140 touches the screen based on the comparison result.

Figure 10:
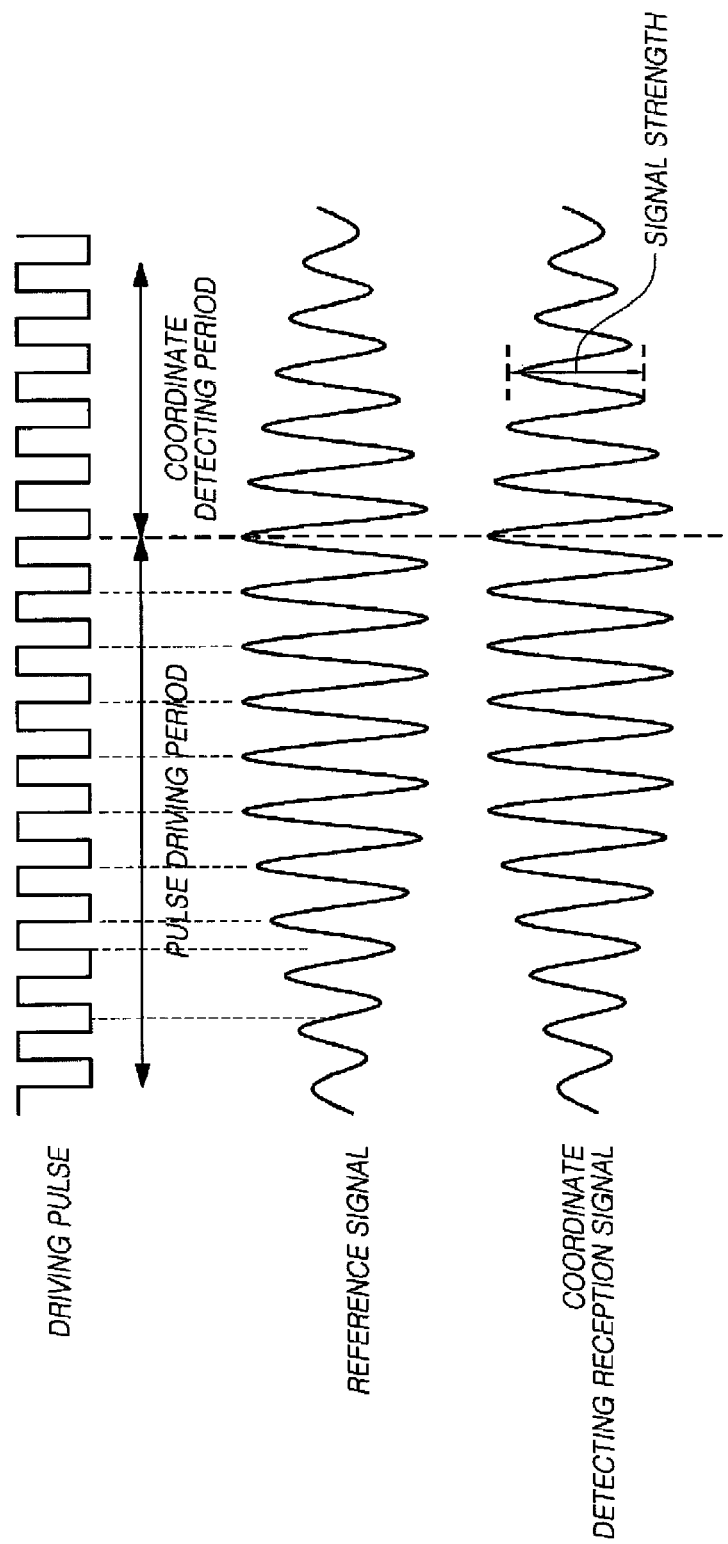
FIG. 10 is a view illustrating a method for detecting the coordinate of the touch sensing system according to an embodiment of the present invention.

The touch processor 130 may calculate the signal strength from a total value of digital values converted by a predetermined coordinate detecting sampling number in a portion of a signal corresponding to a coordinate detecting section, with respect to each of the coordinate detecting reception signals received through the antenna 120, compare the signal strength calculated with respect to each of the pressure detecting reception signals received through the antenna 120, and detect the coordinate of the point where the pen 140 touches the screen according to the comparison result (refer to FIG. 10).

Next, in relation to the pressure detection, when the touch processor 130 detects the pressure, the touch processor 130 detects the pressure by sensing only minimum sensing node by using the coordinate detection result, not sensing all of the sensing nodes equally to the case wherein the coordinate is detected.

To this end, the touch processor 130 may detect the pressure of the pen 140 touching the screen by sensing only the partial sensor nodes based on the pressure detecting reception signal received through the antenna 120, after control to receive the resonance signal, generated from the pen 140, as the pressure detecting reception signal, because the driving pulses are sequentially applied to the main line corresponding to the detected coordinate among the first lines L1 and the second lines L2 and the adjacent line adjacent to the main line.

The touch processor 130 may calculate a phase difference in comparison to a reference signal with respect to each of the pressure detecting reception signals received through the antenna 120 to detect the pressure of the pen 140 touching the screen based on the calculation result.

Figure 11:
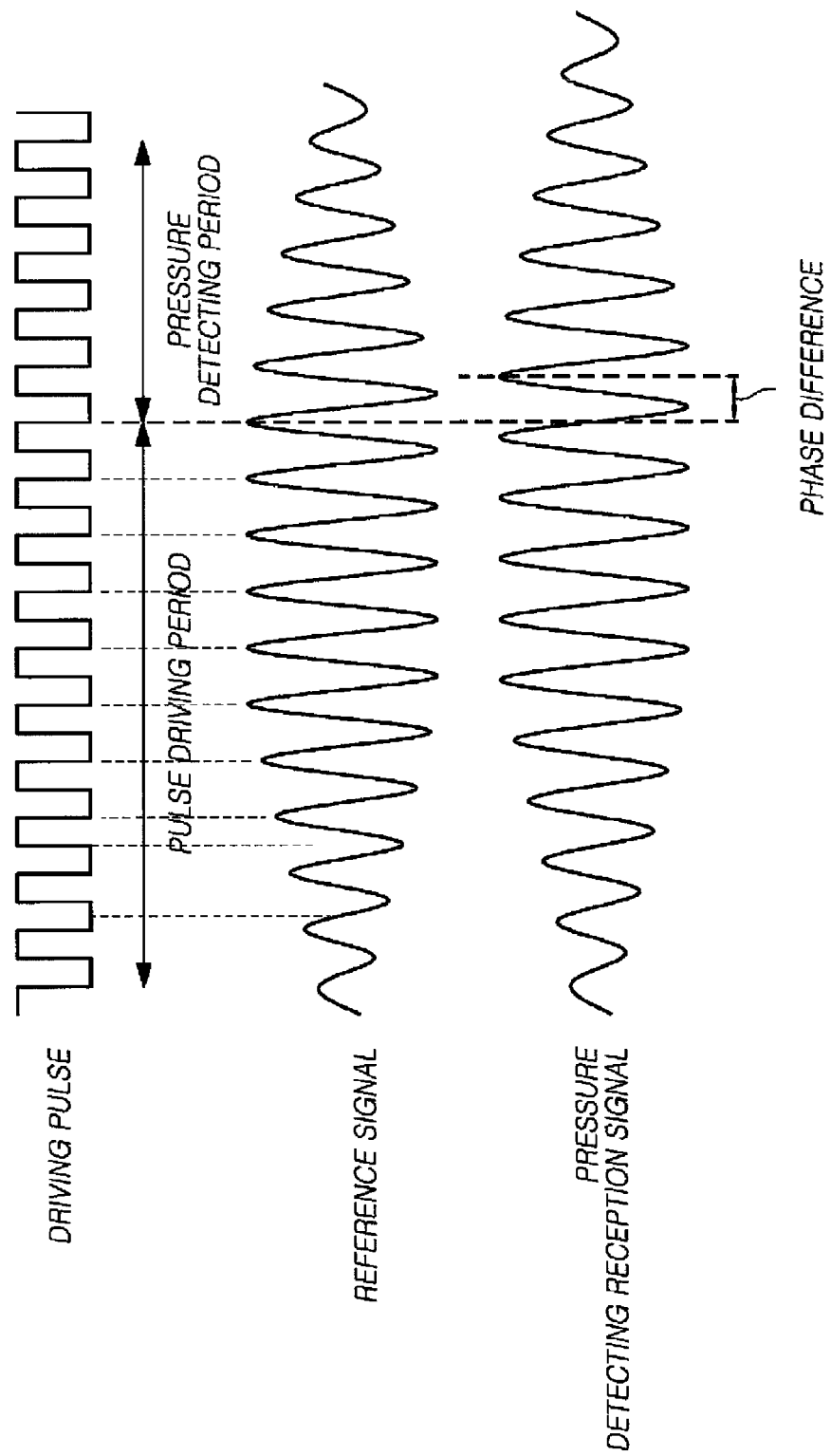
FIG. 11 is a view illustrating a method for detecting the pressure of the touch sensing system according to an embodiment of the present invention.

The touch processor 130 may calculate the phase differences in comparison to the reference signal from a total value of digital values converted by a predetermined pressure detecting sampling number in a portion of a signal corresponding to a pressure detecting section, with respect to each of the pressure detecting reception signals received through the antenna 120, and may detect the pressure of the pen 140 touching the screen based on the phase difference calculated with respect to each of the pressure detecting reception signals received through the antenna 120 (refer to FIG. 11).

When the touch processor 130 calculates the phase difference in comparison to the reference signal with respect to each of the pressure detecting reception signals received through the antenna 120, the touch processor 130 may set the pressure detecting sampling number with respect to each of the pressure detecting reception signals received through the antenna 120 in advance.

At this time, the touch processor 130 may increase the pressure detecting sampling number in correspondence to a decrease of a number of the sensor node for detecting the pressure in comparison to a number of the sensor node for detecting the coordinate.

As described above, in case of the pressure detection, the touch processor 130 senses the sensing nodes of which the number is smaller than the number of the sensing nodes in case of the coordinate detection.

That is, the touch processor 130 detects the pressure by sensing only the portion of the sensing nodes among the sensing nodes sensed when the coordinate is detected.

To this end, the touch processor 130 detects the pressure by sensing only the sensor nodes corresponding to the detected coordinate and the sensor node adjacent to the sensor nodes corresponding to the detected coordinate, by using the coordinate detection result.

The touch processor 130, in order to sense in such a method, may determine the main line (i.e., one or two among the first lines and the second lines defining the sensor node corresponding to the detected coordinate) corresponding to the detected coordinate among the first lines L1 and the second lines L2, determine at least one adjacent line adjacent to the first lines and/or the second lines defining the sensor node corresponding to the detected coordinate, and detect the pressure by sequentially driving the determined one or two main line and at least one of the adjacent line adjacent to the main line.

The above-mentioned main line includes at least one of the first line and the second line defining the sensor node corresponding to the detected coordinate, as the line corresponding to the detected coordinate among the first lines L1 and the second lines L2.

The above-mentioned adjacent line is the line adjacent to the main line corresponding to the detected coordinate among the first lines L1 and the second lines L2, and may include at least one of the first lines formed in front of the first line defining the sensor node corresponding to the detected coordinate, at least one of the first lines formed behind the first line defining the sensor node corresponding to the detected coordinate, at least one of the second lines formed in front of the second line defining the sensor node corresponding to the detected coordinate, and at lease one of the second lines formed behind the second line defining the sensor node corresponding to the detected coordinate.

In the above, the touch sensing system 100 according to an exemplary embodiment is described with reference to FIGS. 1 and 2. Hereinafter, the touch sensing system 100 according to an exemplary embodiment, an inside configuration of the touch sensing system 100 and a method of driving the touch sensing system 100 are described in more detail with reference to FIGS. 3 to 11.

Figure 3:
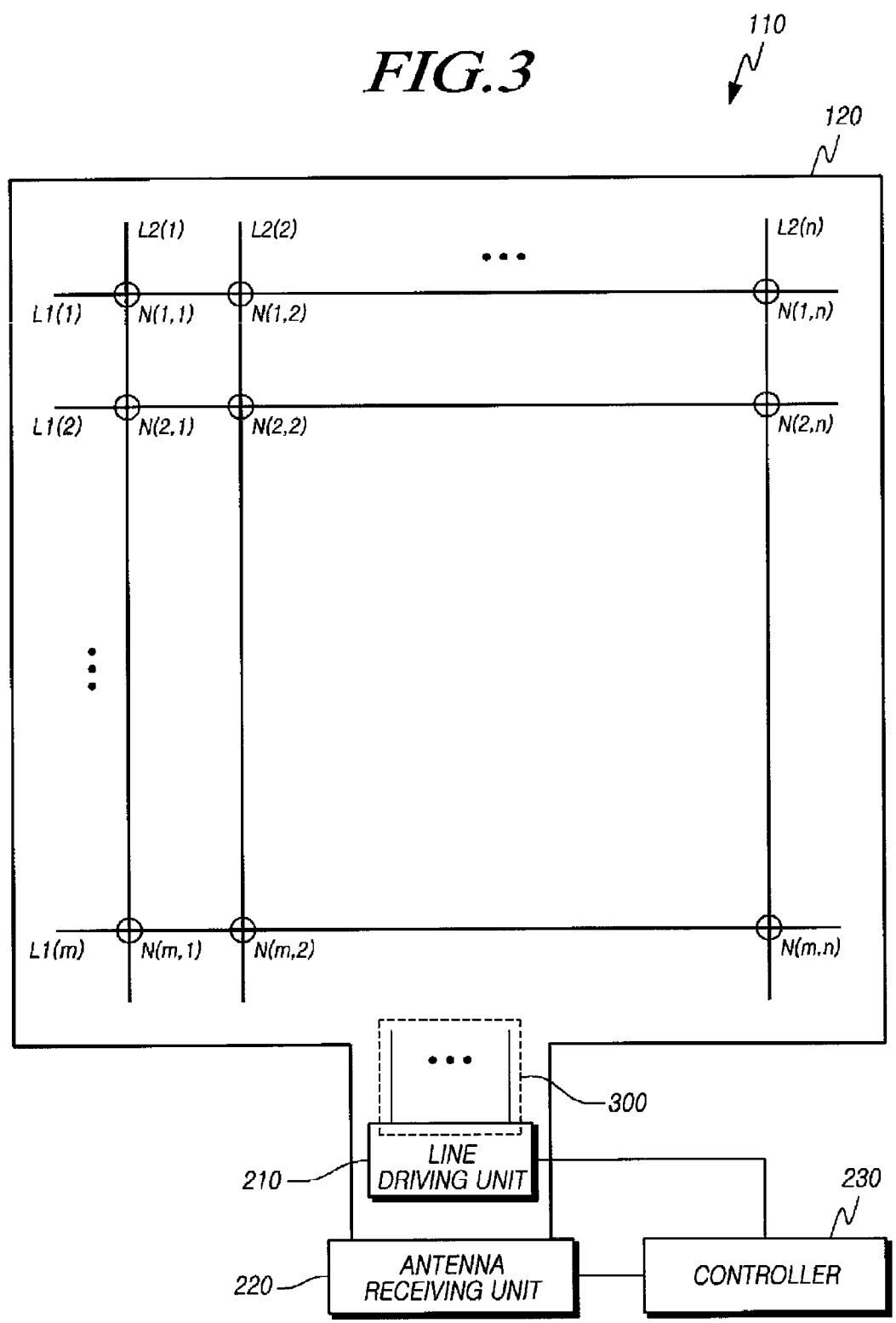
FIG. 3 is a view illustrating first lines and second lines formed in a touch screen panel of the touch sensing system and an antenna formed in a peripheral area of the first lines and the second lines according to an embodiment of the present invention.

FIG. 3 is a view illustrating the first lines L1 and the second lines L2 formed in the touch screen panel 110 of the touch sensing system 100 and the antenna 120 formed in a peripheral area of the first lines L1 and the second lines L2 according to an exemplary embodiment.

As shown in FIG. 3, in the touch screen panel 110, m number of the first lines L1(1), L1(2), . . . , and L1(m) may be formed in a first direction, and n number of the second lines L2(1), L2(2), . . . , and L2(m) may be formed in a second direction crossing the first direction.

Referring to FIG. 3, in the touch screen panel 110, the m number of first lines L(1) to L1(m) and the n number of second lines L2(1) to L2(m) are formed in the crossing directions, and thus sensor nodes N(1,1) to N(1,n), N(m,1), . . . , and N(m,n) are defined at each of the crossing points.

Referring to FIG. 3, each of the m number of first lines L(1) to L1(m) and the n number of second lines L2(1) to L2(m) formed on the touch screen panel 110 may be connected through the line driving unit 210 and a signal wire 300. At this time, for an example, the m number of first lines L(1) to L1(m) and the n number of second lines L2(1) to L2(m) may include divided several groups, may be connected to chips (not shown) of a number equal to the group number, and several chips may be connected to the line driving unit 210 through the signal wire 300. The above-mentioned chip may be located on the PCB connected to the touch screen panel 110.

The m number of first lines L(1) to L1(m) and the n number of second lines L2(1) to L2(m) formed on the touch screen panel 110 may be formed on one layer (i.e., a single layer), and may be formed on two different layers. That is, the touch screen panel 110 may have a single layer structure or a double layer structure.

Meanwhile, the antenna 120 is disposed or formed in the peripheral area of the m number of first lines L(1) to L1(m) and the n number of second lines L2(1) to L2(m). The antenna 120 may be disposed or formed on the touch screen panel 110. Alternatively, the antenna 120 may be disposed or formed on the outside of the touch screen panel 110. The antenna 120 may be referred to a coil having a loop shape (i.e., a ring shape).

FIG. 4 is a view illustrating a touch sensor according to each of the touch modes of the touch sensing system 100 according to an exemplary embodiment.

Referring to FIG. 4, the touch processor 130 of the touch sensing system 100 according to an exemplary embodiment supports two kinds of the touch modes including the finger touch mode and the pen touch mode. When the touch processor 130 recognizes the touch mode as the finger touch mode, the touch processor 130 sets information (i.e., a mode) indicating the kind of the touch mode with a specific value (1). In addition, when the touch processor 130 recognizes the touch mode as the pen touch mode, the touch processor 130 sets the information (i.e., the mode) indicating the kind of the touch mode with a specific value (2).

In addition, the touch processor 130 controls to operate the driving line (i.e., the Tx line) and the sensing line (i.e., the Rx line) corresponding to the kind of the recognized touch mode as shown in FIG. 4, based on the result of the recognizing the kind of the touch mode, that is, based on the setting value of the information (i.e., the mode) indicating the kind of the touch mode.

Referring to FIG. 4, when the touch mode is the finger touch mode, the touch processor 130 controls to operate one (L1 or L2) of the first lines L1 and the second lines L2 as the driving line, and to operate another (L2 or L1) of the first lines L1 and the second lines L2 as the sensing line.

Referring to FIG. 4, when the touch mode is the pen touch mode, the touch processor 130 may control to operate all of the first lines L1 and the second lines L2 as the driving line, and to operate the antenna (ANT) 120 as the sensing line.

Hereinafter, a method for driving the touch sensing system 100 in the pen touch mode among the kinds of the touch modes is described in more detail. Prior to this, an operation and an inside configuration of the pen 140 schematically described with reference to FIG. 2 is described in more detail with reference to FIG. 5.

Figure 5:
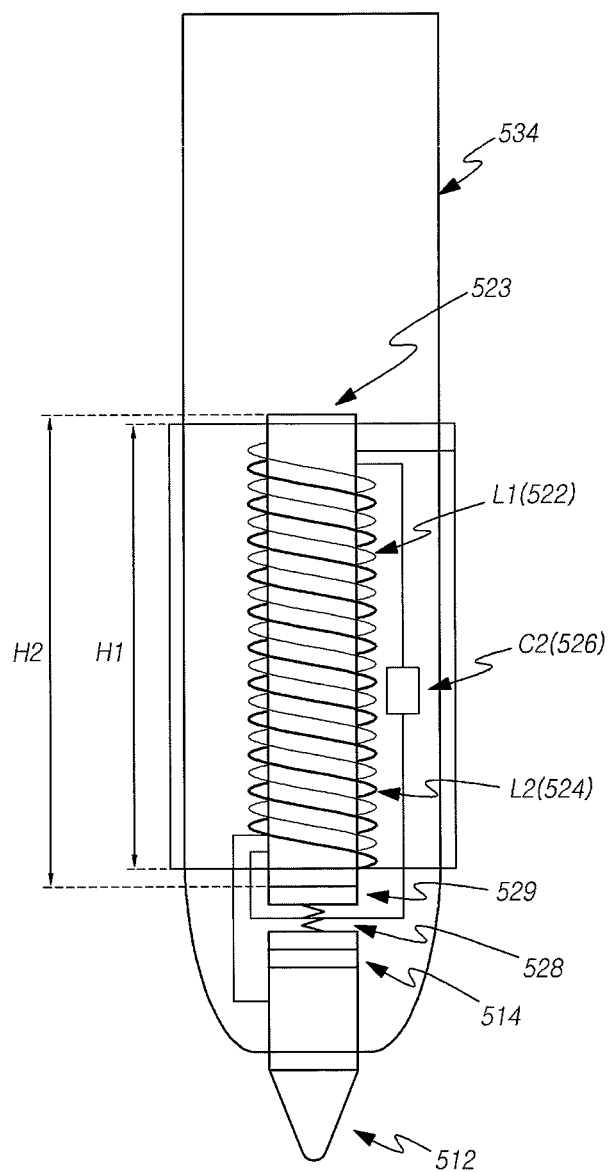
FIG. 5 is a view illustrating an inside configuration of a pen in the touch sensing system according to an embodiment of the present invention.

FIG. 5 is a view illustrating the inside configuration of the pen 140 in the touch sensing system 100 according to an exemplary embodiment.

Referring to FIG. 5, the pen 140 may include a conductivity tip 512, a first coil (L1) 522 connected to the conductivity tip 512, and a ground plate 536 electrically connected to the first coil 522.

The pen 140 may further include a second coil (L2) 524 and a resonance capacitor (C2) 526 connected to the second coil 524 in series in order to additionally form a resonance circuit. The resonance circuit configuration is for amplifying the electromagnetic signal, and may be omitted as necessary. In addition, an additional configuration described below may be omitted according to the need.

The pen 140 may further include a magnetic core 523. The magnetic core 523 may form a magnetic path of the first coil (L1) 522 and increase an inductance of the first coil 522. In addition, the magnetic core 523 forms a path where a magnetic field formed in the first coil 522 is transferred to the antenna 120. Thus the magnetic core 523 enables the electromagnetic signal to be transferred from the pen 140 to the antenna 120 well.

The magnetic core 523 strengthens a magnetic combination between the first coil 522 and the second coil 524. A mutual inductance M12 between the first coil 522 and the second coil 524 may increase according to the magnetic core 523.

The pen 140 may further include two insulating films 514 and 529 in order to form an insulation between the magnetic core 523 and the conductivity tip 512, and may further include a switch 528 capable of operating a short circuit of the resonance between the second coil 524 and the resonance capacitor 526.

Meanwhile, the switch 528 may further include an elasticity member (e.g., a spring). The switch 528 may determine whether the pen 140 contacts with the touch screen panel 110 by recognizing a pressure transferred through the conductivity tip 512, and may operate the short circuit or an open of the resonance circuit according to the determination.

The pen 140 may further include a non-conductivity pail 534 having a pen shape surrounding the first coil 522. The pen 140 may have the pen shape familiar to the user through the pen shape of pail 534.

Figure 6:
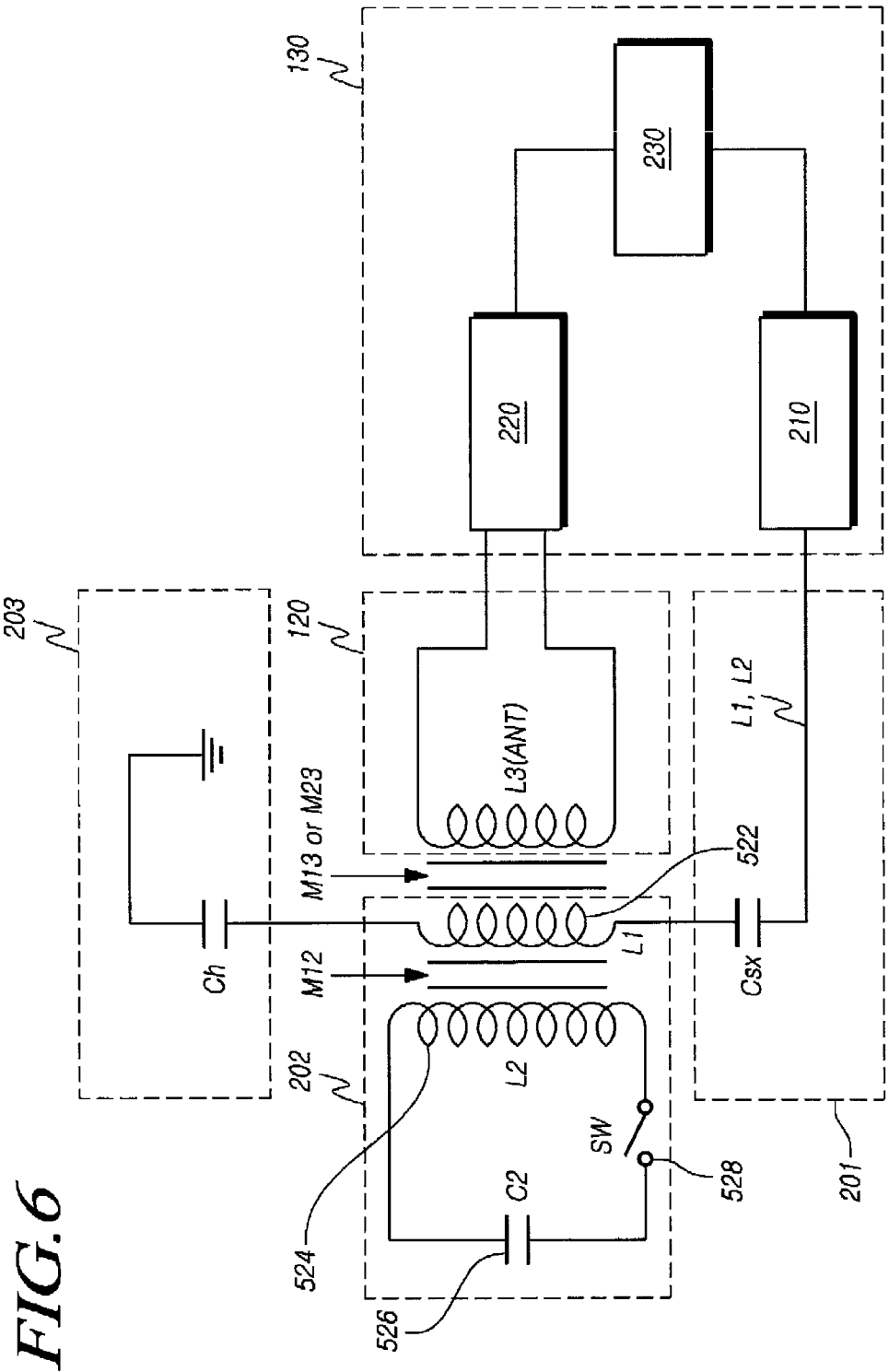
FIG. 6 is a circuit diagram illustrating the touch sensing system according to an embodiment.

FIG. 6 is a circuit diagram illustrating the touch sensing system 100 according to an exemplary embodiment.

Referring to FIG. 6, the contact unit 201 includes the conductivity tip, and forms the capacitor (referred to as a sensing capacitor for distinguishing the capacitor formed by the contact unit 201 from another capacitor) Csx between the contact unit 201 and the electrode (i.e., the first lines L1 and the second lines L2) of the touch screen panel 110.

At this time, the driving pulse which is an AC power output through the electrode (i.e., the first lines L1 and the second lines L2) by the line driving unit 210 flows to the sensing capacitor Csx and the driving pulse is transferred to the electromagnetic circuit unit 202, under the control of the controller.

The electromagnetic circuit unit 202 may include the first coil (L1) 522 connected to the contact unit 201 by a wire, the second coil (L2) 524 magnetically combined to the first coil 522, and the resonance capacitor (C2) 526 generating a resonance between the second coil 524 and the resonance capacitor 526.

The driving pulse which is the AC power input through the sensing capacitor 512 flows to the first coil (L1) 522 connected to the sensing capacitor 512 by a wire. And, the AC power is transferred to the second coil (L2) 524 combined with the first coil (L1) 522 in a mutual inductance M12 according to the electromagnetic inducement. The AC power flowing through the second coil (L2) 524 forms a resonance current between the second coil 524 and the resonance capacitor 526.

Referring to FIG. 6, a damping resistance is not generated between the second coil 524 and the resonance capacitor 526, and thus the resonance current between the second coil 524 and the resonance capacitor 526 may be continuously amplified by a new input. For example, when the AC power of a first period is transferred through the sensing capacitor Csx, the second coil 524 and the resonance capacitor 526 form the resonance current by the AC power of the first period. In addition, when the AC power of the next period is transferred, the resonance current of the second coil 524 and the resonance capacitor 526 is further amplified because an additional resonance current generated by the new AC power is added to the previously formed resonance current. When the AC power is input continuously, the resonance current between the second coil 524 and the resonance capacitor 526 is continuously amplified.

The driving pulse which is the AC power generated from the ling driving unit 210 may generate the AC power having a period substantially identical to a resonance period, in order to activate the resonance between the second coil 524 and the resonance capacitor 526. For example, the line driving unit 210 may output the AC power having a frequency substantially identical to a frequency obtained by f=1/[2π*(L2*C2)^0.5] to the first lines and the second lines. The AC power may have a sine wave, but is not limited thereto. Alternatively, the AC power may have a square waveform.

The AC current flowing through the first coil 522 or the resonance current flowing through the second coil 524 transfers the electromagnetic signal (e.g., the magnetic signal) to the antenna (L3) 120 of the touch screen panel 110 combined by a mutual inductance M13 or M23 according to the electromagnetic induction.

The electromagnetic signal (i.e., a reception signal, the coordinate detecting reception signal or the pressure detecting reception signal) input through the antenna 120 is transmitted to the antenna receiving unit 220, and may be used for the coordinate detection and the pressure detection by the controller 230.

At this time, the signal received through the antenna receiving unit 220 is amplified by an amplifier, filtered by a filter, and converted into a digital signal by an Analog Digital Converter (ADC). The converted digital signal is signal-processed, the coordinate where the pen 140 touches and the pressure of the pen 140 are detected, and thus the touch is sensed. The above-mentioned amplifier, filter, ADC and the signal processing configuration may be included in the antenna receiving unit 220 or the controller 230, or may be dividedly included in the antenna receiving unit 220 and the controller 230.

Meanwhile, a closed circuit enabling the AC power to flow to the touch panel again should be formed so that the AC power flows to the sensing capacitor Csx. To this end, the electromagnetic circuit unit 202 is electrically connected to the ground unit 203, and the ground unit 203 forms a ground state.

The pen 140 is an apparatus operated by the user's body, and contacts with the user's body. The ground unit 203 forms a ground surface with the user's body, and flows the AC power to the ground through the ground surface and the user. Referring to FIG. 6, a human capacitor Ch may be formed between the ground and the user, the ground unit 203 enables the AC power to flow to the ground through the human capacitor Ch by the contact with the user's body.

The touch screen panel 110 may form the ground and the capacitor through another path (not shown), and the pen 140 and the touch screen panel 110 form the closed circuit for the AC power through the capacitor.

In addition, a switch (SW) 528 may be further included between the second coil 524 and the resonance capacitor 526. The switch 528 may open or close a resonance path so that the resonance current is generated or not according to the need.

Figure 7:
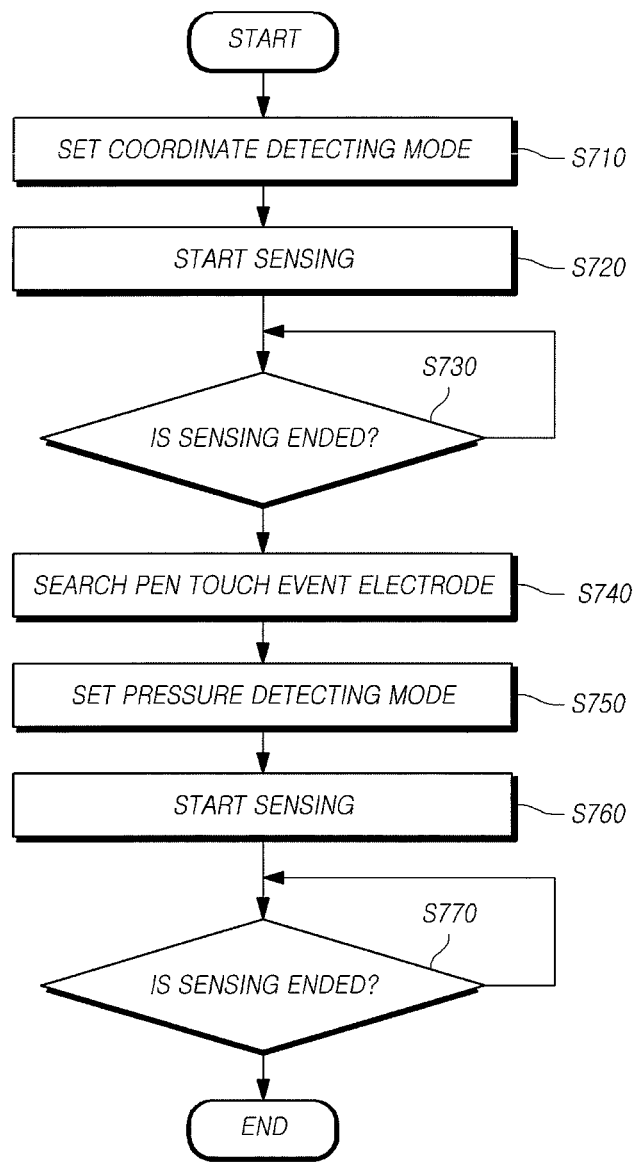
FIG. 7 is a flowchart illustrating a method for driving the touch sensing system according to an embodiment of the present invention.

FIG. 7 is a flowchart illustrating the method for driving the touch sensing system 100 according to an exemplary embodiment.

Referring to FIG. 7, the method for driving the touch sensing system 100 according to an exemplary embodiment includes coordinate detecting steps (S710 to S730), a pressure detection range setting step (S740), pressure detecting steps (S750 to S770).

Referring to FIG. 7, the coordinate detecting steps includes a step of setting a coordinate detection mode (S710), a step of controlling to receive the resonance signal generated from the pen 140 touching the screen as the coordinate detecting reception signal through the antenna 120 because the driving pulses are sequentially applied to each of the first lines L1 and the second lines L2, by sensing all of the sensing nodes (S720), a step of checking whether the sensing is finished because the driving pulses are applied to each of all lines including the first lines L1 and the second lines L2 and all of the signals are received through the antenna 120 (S730), etc.

In step S720, one line may be driven by a number of a pulse predetermined to the m number of first lines and the n number of second lines, and data of the signal generated from the resonance of the pen 140 and received through the antenna 120 may be stored to memories of each of the sensor nodes.

In step S730, the coordinate of the point where the pen 140 touches the screen is detected by using the signal (i.e., the data) received through the antenna 120, according to the end of the sensing.

After the coordinate detecting step and before the pressure detecting step, the pressure detection range setting step (S740) determining the sensor nodes for detecting the pressure may be performed.

In step S740, the sensor nodes corresponding to the coordinate detected in the coordinate detecting step and front, rear, up and down sensor nodes of the sensor nodes corresponding to the detected coordinate are determined as the sensor node to be sensed, as a step of determining the sensor node for detecting the pressure of the pen 140 touching the screen.

Thus, in step S740, the electrode (i.e., the main line which are the first lines and/or the second lines) corresponding to the coordinate of the point where the pen 140 touches the screen is searched, and a peripheral electrode (i.e., the adjacent line) of the searched electrode is further determined.

Next, the pressure detecting step is performed, the pressure detecting step includes a step of setting a pressure detection mode (S750), in order to detect the pressure, a step of sensing the sensor nodes determined in step S740 (S760), a step of checking whether the sensing is ended (S770), etc.

In step S770, the phase differences with respect to each of the signals received through the antenna 120 are calculated, based on an internal clock signal and the reference signal without a phase delay, by a number equal to or larger than a certain sampling number. At this time, the sampling number of each of the sensor nodes may be set up to a maximum permission range in consideration of a quality of the pressure detection.

Figure 8:
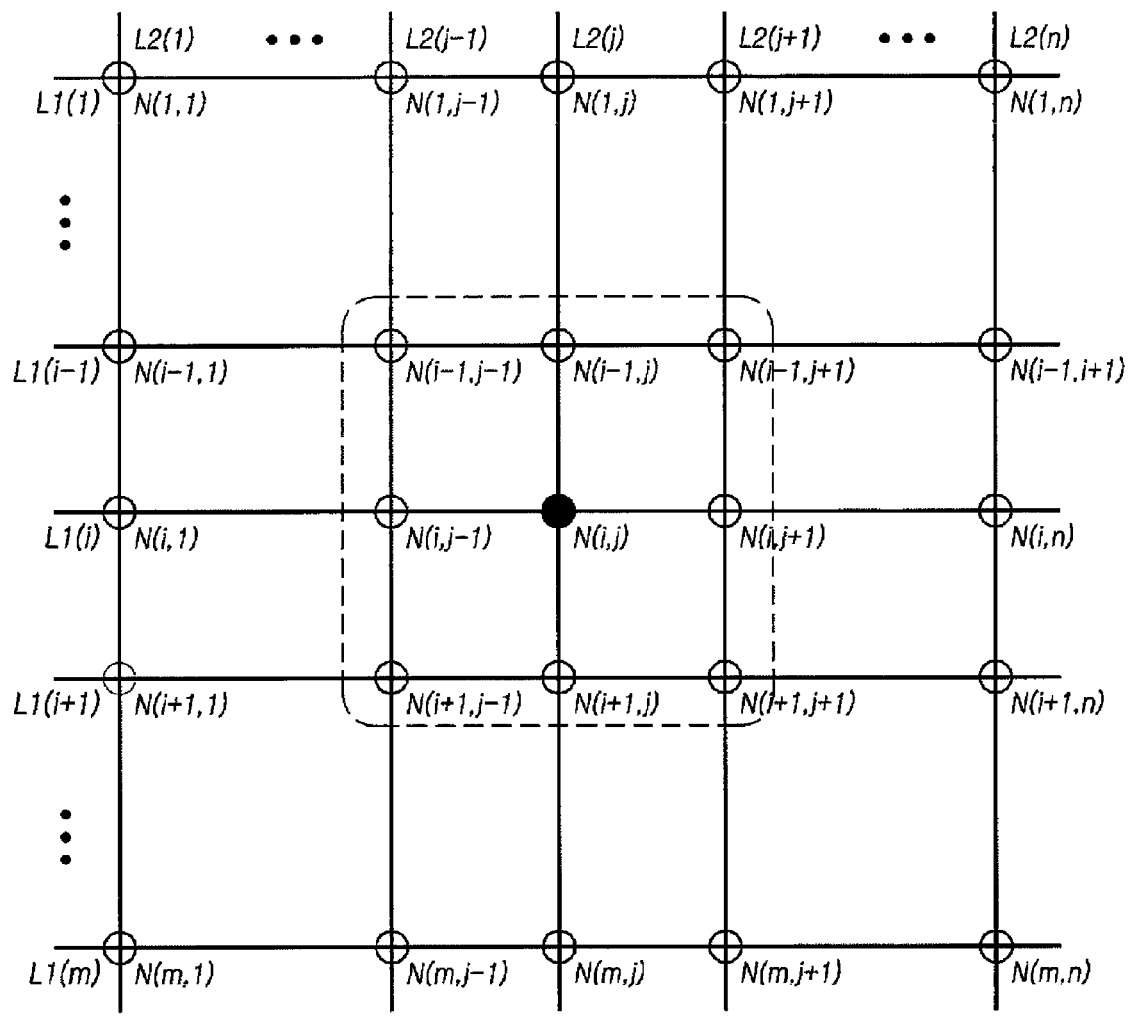
FIG. 8 is a view for describing sensing nodes for detecting a coordinate, and sensing nodes for detecting a pressure of the touch sensing system according to an embodiment of the present invention.

FIG. 8 is a view for describing the sensing nodes for detecting the coordinate, and the sensing nodes for detecting the pressure of the touch sensing system 100 according to an exemplary embodiment.

Referring to FIG. 8, when lines corresponding to the detected coordinate among the first lines L1 and the second lines L2 are an L1(i) and an L2(j), the sensor node corresponding to the detected coordinate is an N(i,j) which is a sensor node defined by a crossing of the L1(i) and the L2(j). The main line may be one of the L1(i) and the L2(j).

At least one of the peripheral sensor nodes N(i−1,j−1), N(i−1,j), N(i−1, j+1), N(i,j−1), N(i, j+1), N(i+1,j−1), N(i+1,j) and N(i+1, j+1) of the sensor node corresponding to the detected coordinate may be sensed for detecting the pressure. Thus, the adjacent line may include at lease one of L1(i−1), L1(i+1), L2(j−1) and L2(j+1).

Figure 9:
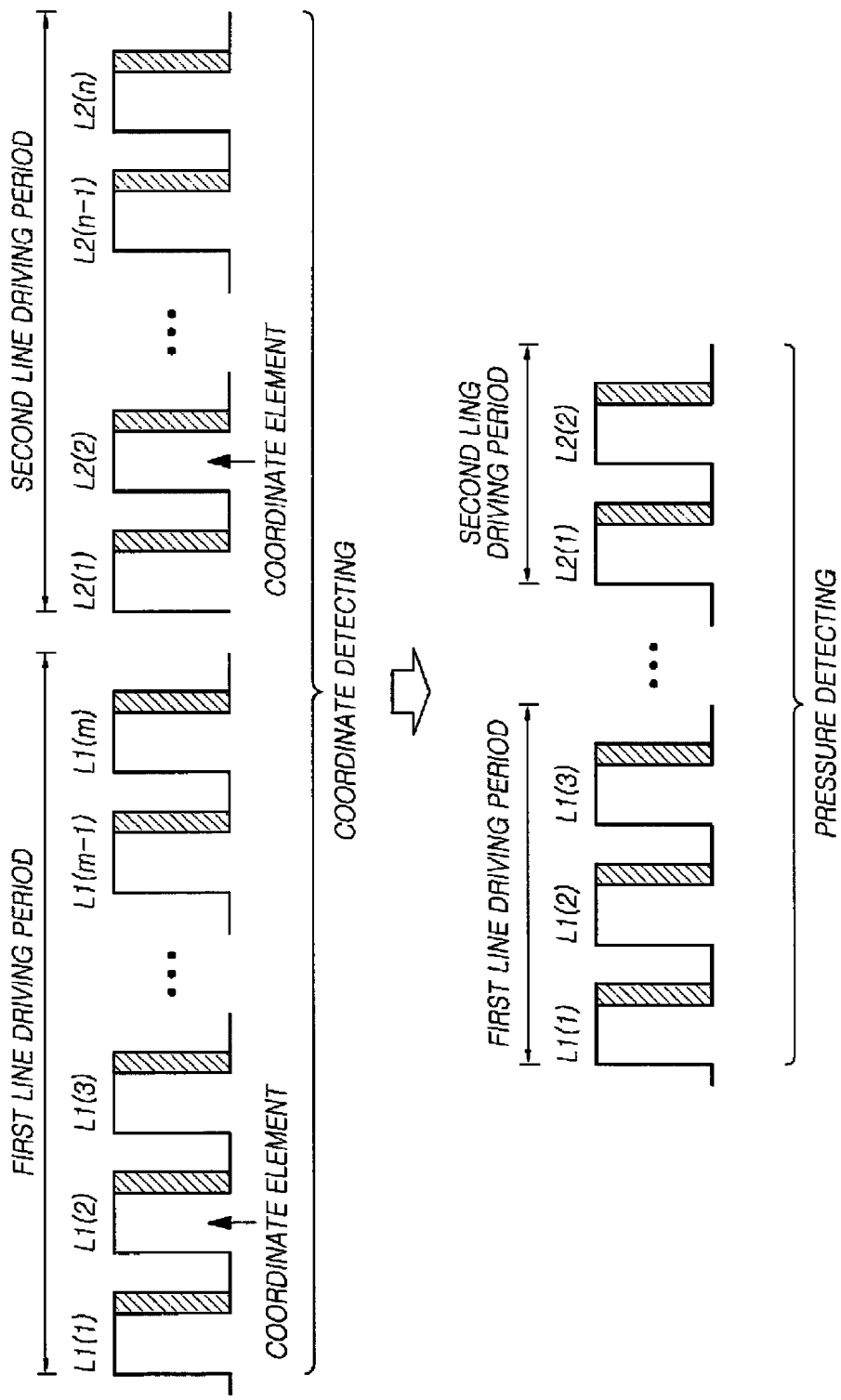
FIG. 9 is a view illustrating driving pulse for detecting the coordinate and driving pulse for detecting the pressure of the touch sensing system according to an embodiment of the present invention.

FIG. 9 is a view illustrating the driving pulse for detecting the coordinate and the driving pulse for detecting the pressure of the touch sensing system 100 according to an exemplary embodiment.

Referring to FIG. 9, as described above, in the pen touch mode, for example, the touch sensing system 100 detects the coordinate first, and performs the pressure detection by using the coordinate detection result.

Thus, as shown in FIG. 9, in order to detect the coordinate, the driving pulses are sequentially provided to each of the m number of first lines L1(1) to L1(m) during a first line driving period, and the driving pulses are sequentially provided to each of the n number of second lines L2(1) to L2(n) during a second line driving period.

When the driving pulses are sequentially provided to each of the m number of first lines L1(1) to L1(m) during the first line driving period, the driving pulse is provided to an ith first line, the signal (i.e., the coordinate detecting reception signal) is received through the antenna 120, and then the driving pulse is provided to the next (i+1)th first line.

In addition, when the driving pulses are sequentially provided to each of the n number of second lines L2(1) to L2(n) during the second line driving period, the driving pulse is provided to a jth second line, the signal (i.e., the coordinate detecting reception signal) is received through the antenna 120, and then the driving pulse is provided to the next (j+1)th second line.

As described above, the coordinate is detected during or after the first line driving period and the second line driving period. Referring to an example of FIG. 9, one line L1(2) among the m number of first lines L1(1) to L1(m) is a line corresponding to a first element of the detected coordinate, and one line L2(2) among the n number of second lines L2(1) to L2(n) is a line corresponding to a second element of the detected coordinate.

The L1(2) and the L2(2) corresponding to the first element and the second element of the detected coordinate are the main lines. The pressure may be detected by sequentially driving the L1(1), L1(3) and L2(1) corresponding to the adjacent lines adjacent to the main lines, i.e., the L1(2) and L2(2).

As described above, when the pressure is detected, only the minimum sensing node is sensed, therefore a sensing time may decrease, a calculation amount according to the pressure detection may decrease, an Analog to Digital (A/D) converting limit of each of the sensor nodes may be overcome, a memory needed in sensing may decrease, ultimately, a touch sensing time may decrease, and thus a performance of the display apparatus may increase.

In addition, an accuracy of the pressure detection result may increase by increasing the sampling number for detecting the pressure in correspondence to the decrease of the sensing time, in a scope wherein the whole touch sensing time may be decreased.

FIG. 10 is a view illustrating the method for detecting the coordinate of the touch sensing system 100 according to an exemplary embodiment.

Referring to FIG. 10, the touch processor 130 may calculate the signal strength of the coordinate detecting reception signal received through the antenna 120, and compare the signal strengths of each of the coordinate detecting reception signals to detect the coordinate (x,y) of the point where the pen 140 touches the screen. At this time, the stronger the signal strength is, the nearer the line is to the touched point.

Referring to FIG. 10, the touch processor 130 may calculate the signal strength from the total value of the digital values converted by the predetermined coordinate detecting sampling number (e.g., 500 to 1024 numbers) in the portion of the signal corresponding to the coordinate detecting section, based on a clock of the driving pulse, with respect to each of the coordinate detecting reception signals received through the antenna 120, compare the signal strength calculated with respect to each of the pressure detecting reception signals received through the antenna 120, and detect the coordinate of the point where the pen 140 touches the screen according to the comparison result.

FIG. 11 is a view illustrating the method for detecting the pressure of the touch sensing system according to an exemplary embodiment.

Referring to FIG. 11, the touch processor 130 may calculate the phase difference in comparison to the reference signal with respect to each of the pressure detecting reception signals received through the antenna 120 to detect the pressure of the pen 140 touching the screen based on the calculation result.

Referring to FIG. 11, the touch processor 130 may calculate the phase differences in comparison to the reference signal from the total value of the digital values converted by the predetermined pressure detecting sampling number in the portion of the signal corresponding to the pressure detecting section, based on the internal clock of the driving pulse and the reference signal without a phase delay, with respect to each of the pressure detecting reception signals received through the antenna 120, and may detect the pressure of the pen 140 touching the screen based on the phase difference calculated with respect to each of the pressure detecting reception signals received through the antenna 120.

When the pressure is detected, the sampling number for detecting the pressure is set to be increased in correspondence to the decrease of the number of the sensor node for detecting the pressure, therefore the touch sensing time may decrease as much as possible and the pressure may be accurately detected.

The above-mentioned touch sensing system 100 may be included in a display apparatus such as a Liquid Crystal Display (LCD) apparatus, an Organic Light Emitting Diode (OLED) display apparatus, a Plasma Display Panel (PDP), etc.

The display apparatus is described with reference to FIGS. 12 to 15.

Figure 12:
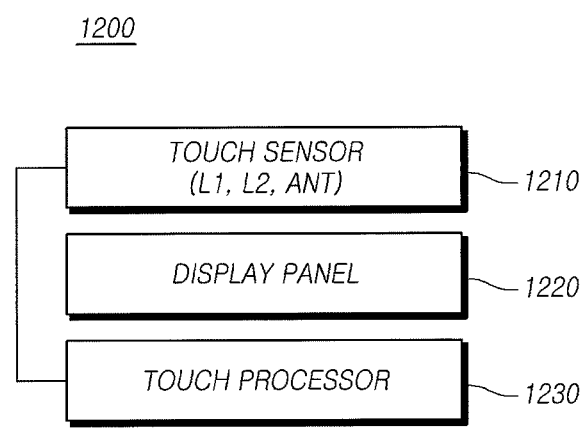
FIG. 12 is a view schematically illustrating a display apparatus according to an embodiment of the present invention.

FIG. 12 is a view schematically illustrating a display apparatus 1200 according to an exemplary embodiment.

Referring to FIG. 12, the display apparatus 1200 according to an exemplary embodiment includes a display panel 1220, a touch sensor 1210 including the first lines L1 and the second lines L2 formed in the crossing directions and the antenna 120 formed at the peripheral are of the first lines L1 and the second lines L2, a touch processor 1230 performing the first touch process by receiving the signal, with respect to the driving pulses applied to each of the first lines L1 and the second lines L2, through the antenna 120, and then performing the second touch process by sequentially applying the driving pulses to each of two or more selected lines among the first lines L1 and the second lines L2 and receiving the signal through the antenna 120, etc.

The touch processor 1230 shown in FIG. 12 is preferably identical to the above-mentioned touch processor 130 but can have some variations as needed.

In addition, the antenna 120 may be formed or disposed on the touch screen panel 110 (see FIGS. 1 and 2). The display apparatus 1200 may include the touch screen panel 110. Alternatively, the antenna 120 may be formed or disposed the outside of the touch screen panel 110.

Referring to FIG. 12, the first lines L1 and the second lines L2 may be formed on the touch screen panel 110, and the touch screen panel 110 may be attached on the display panel 1220 included in the display apparatus 1200 in the add-on type. Alternatively, the touch screen panel 110 may be included in the display panel 1220 in the on-cell type or the in-cell type.

Figure 13:
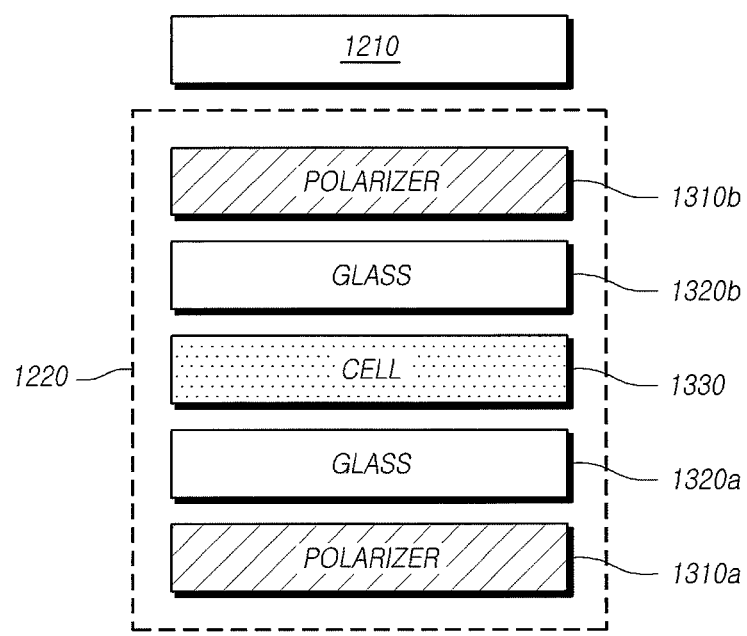
FIGS. 13 to 15 are views illustrating touch sensor implement methods of the display apparatus according to an embodiment of the present invention.
Figure 14:
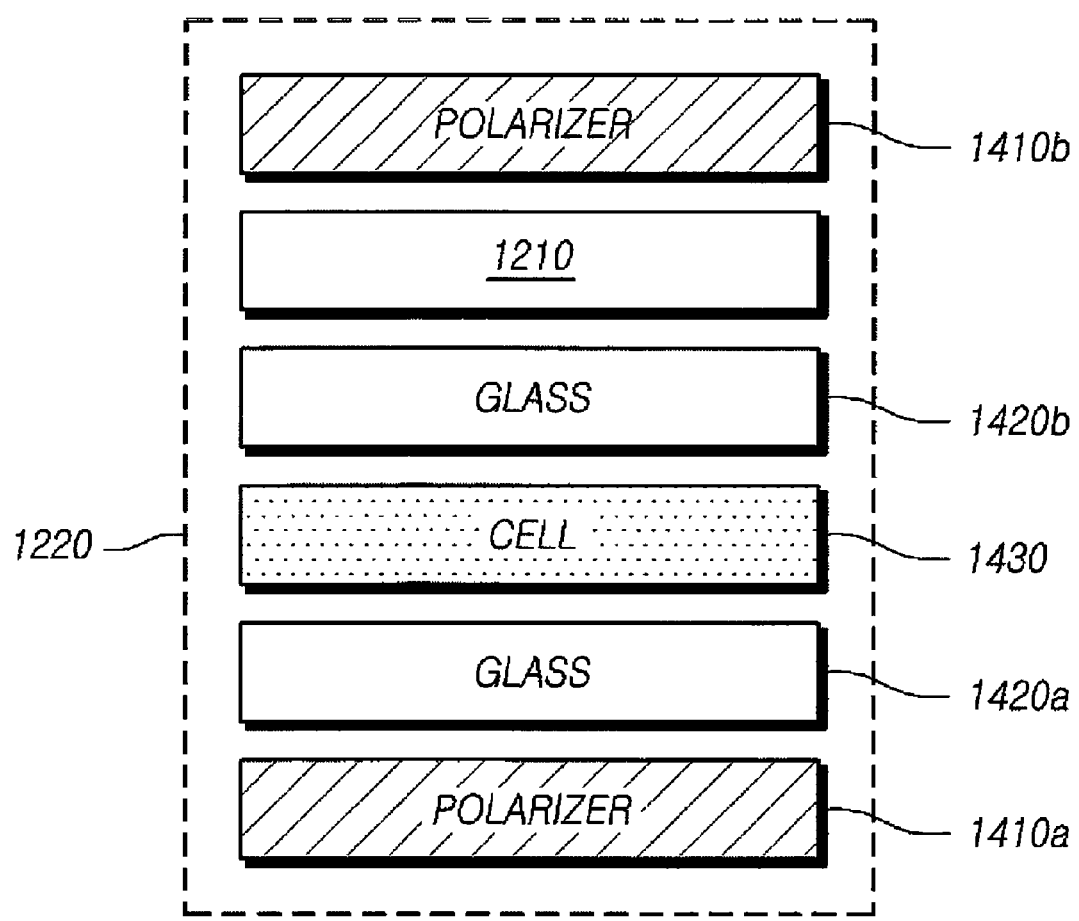
Figure 15:
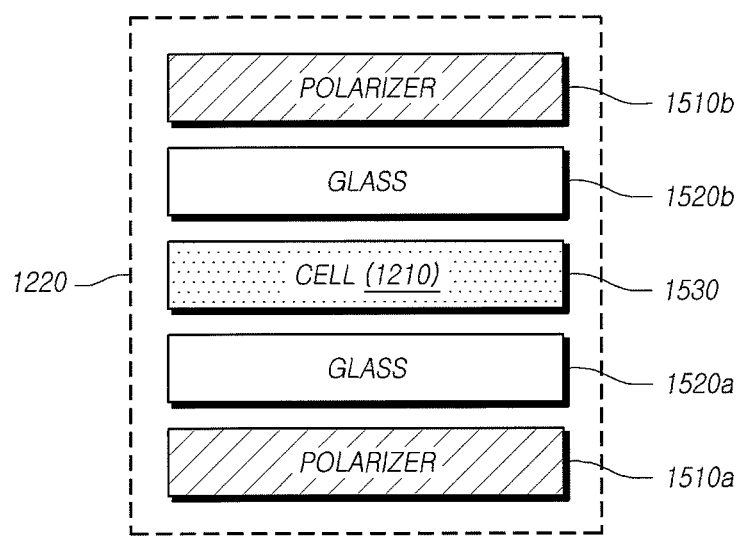

Three kinds of implementation methods of the above-mentioned touch screen panel 110, that is three kinds of implementation methods of the touch sensor 1210, are illustrated in FIGS. 13 to 15, respectively.

FIGS. 13 to 15 are views illustrating the touch sensor implementation method of the display apparatus 1200 according to an embodiment of the present invention.

FIG. 13 is a view illustrating a case wherein the touch sensor 1210 such as the first lines L1, the second lines L2 and so on is formed in the touch screen panel 110, and the touch screen panel 110 is attached to the display panel 1220 in the add-on type.

Referring to FIG. 13, in the display panel 1220, a cell 1330 is formed between the upper glass 1320b and the lower glass 1320a, a lower polarizer 1310a is formed under the lower glass 1320a, and an upper polarizer 1310b is formed on the upper glass 1320b.

Here, for example, the cell 1330 may be a liquid crystal layer of the LCD apparatus or an organic layer of the OLED display apparatus.

The touch screen panel 110 including the touch sensor 1210 such as the first lines L1, the second lines L2 and so on is attached on the display panel 1220 through an air layer or a bonding material. Here, for example, an Optical Clear Resin (OCR) or an Optically Clear Adhesive (OCA) may be used as the bonding material.

FIG. 14 is a view illustrating a case wherein the touch sensor 1210 such as the first lines L1, the second lines L2 and so on is formed in the touch screen panel 110, and the touch screen panel 110 is included in the display panel 1220 in the on cell type.

Referring to FIG. 14, in the display panel 1220, a cell 1430 is formed between an upper glass 1420b and a lower glass 1420a. The lower glass 1420a, the cell 1430 and the upper glass 1420b may be referred to as a "display".

A lower polarizer 1410a is formed under the lower glass 1420b, and the touch screen panel 110 including the touch sensor 1210 such as the first lines L1, the second lines L2 and so on is included between the upper glass 1420b and the upper polarizer 1410b.

At this time, the touch sensor 1210 such as the first lines L1, second lines L2 and so on is thin-film-deposited on the upper glass 1420b with an Indium Tin Oxide (ITO) and so on, and thus the touch screen panel 110 is included between the upper glass 1420b and the upper polarizer 1410b.

That is, in case of the on cell type, as shown in FIG. 14, the touch sensor 1210 is disposed on the "display" including the lower glass 1420a, the cell 1430 and the upper glass 1420b. Here, for example, the cell 1430 may be the liquid crystal layer of the LCD apparatus or the organic layer of the OLED display apparatus.

FIG. 15 is a view illustrating a case wherein the touch sensor 1210 such as the first lines L1, the second lines L2 and so on is included in the display panel 1220 in the in cell type.

Referring to FIG. 15, in the display panel 1220, a cell 1530 is formed between an upper glass 1520b and a lower glass 1520a. The lower glass 1520a, the cell 1530 and the upper glass 1520b may be referred to as the "display".

Here, the touch sensor 1210 such as the first lines L1, second lines L2 and so on is formed in the cell 1530. That is, the touch sensor 1210 such as the first lines L1, the second lines L2 and so on may be thin-film-deposited on the lower glass 1520a, which may be a Thin Film Transistor (TFT) array substrate, with the ITO and so on along with the TFT.

A lower polarizer 1510a is formed under the lower glass 1520a, and an upper polarizer 1510b is formed on the upper glass 1520b.

That is, in case of the in cell type, as shown in FIG. 15, the touch sensor 1210 is disposed in the "display" including the lower glass 1510a, the cell 1530 and the upper glass 1520b. Here, for example, the cell 1530 may be the liquid crystal layer of the LCD apparatus or the organic layer of the OLED display apparatus.

As described above, according to the present invention, there is the effect of providing the touch sensing system 100 and the display apparatus 1200 capable of effectively sensing the touch at high speed.

In addition, according to the present invention, there is the effect of providing the combined shape of touch sensing structure for effectively providing the different kinds of the touch modes, without inclusion of the additional touch sensing structure according to each of the different kinds of the touch modes such as the finger touch mode and the pen touch mode, and the touch sensing system 100 and the display apparatus 1200 performing a sensing driving by using the combined shape of touch sensing structure.

In addition, according to the present invention, there is the effect of providing the touch sensing system 100 and the display apparatus 1200 supporting the pen touch mode in which the capacitance method and the electromagnetic inducement method are combined.

In addition, according to the present invention, there is the effect of providing the touch sensing system 100 and the display apparatus 1200 capable of sensing (specially, the pen touch sensing) the touch at high speed, and decreasing the calculation amount and a memory space for the touch sensing.

In addition, according to the present invention, there is the effect of providing the touch sensing system 100 and the display apparatus 1200 capable of quickly detecting the pressure of the pen touching the screen in the pen touch mode, and increasing the accuracy of the pressure detection result.

While the technical spirit of the embodiments of the present invention has been exemplarily described with reference to the accompanying drawings, it will be understood by a person skilled in the art that the present invention may be varied and modified in various forms without departing from the scope of the present invention. Accordingly, the embodiments disclosed in the present invention are merely to not limit but describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:
1. A touch sensing system comprising:
a touch screen panel that includes a screen, and that defines sensor nodes by first lines and second lines disposed in crossing directions in a non-loop shape;
an antenna having a loop shape disposed in a peripheral area of the first lines and the second lines; and
a touch processor including a line driving unit, an antenna receiving unit, and a controller controlling the line driving unit and the antenna receiving unit to perform a touch process, the touch processor configured to:

detect a coordinate of a point where a pen touches the screen, by sensing the sensor nodes through a sequential driving of the first lines and the second lines and a reception of a resonance signal of the pen touching the screen through the antenna, and using the detected coordinate of the point, detect a pressure of the pen touching the screen, by sensing only a portion of the sensor nodes among the sensor nodes through a sequential driving of a main line corresponding to the detected coordinate among the first lines and the second lines and an adjacent line adjacent to the main line, and the reception of the resonance signal of the pen through the antenna, wherein the antenna operates as a sensing line to receive the resonance signal of the pen touching the screen and provides the resonance signal to the antenna receiving unit for the controller to perform the touch process, and wherein the first lines and the second lines operate as driving lines to receive a driving signal.

2. The touch sensing system of claim 1, wherein the touch processor detects the coordinate of the point where the pen touches the screen, by sensing the sensor nodes based on a coordinate detecting reception signal received through the antenna, after the touch processor controls to receive the resonance signal as the coordinate detecting reception signal through the antenna, the resonance signal being generated from the pen touching the screen due to sequential appliances of driving pulses to each of the first lines and the second lines, and the touch processor detects the pressure of the pen touching the screen, by sensing the portion of the sensor nodes based on a pressure detecting reception signal received through the antenna, after the touch processor controls to receive the resonance signal as the pressure detecting reception signal through the antenna, the resonance signal being generated from the pen due to the sequential appliances of the driving pulse to the main line and the adjacent line adjacent to the main line, the main line corresponding to the detected coordinate among the first lines and the second lines.

3. The touch sensing system of claim 2, wherein the touch processor calculates a phase difference in comparison to a reference signal with respect to each of the pressure detecting reception signals received through the antenna, and detects the pressure of the pen touching the screen, based on the calculation result.

4. The touch sensing system of claim 3, wherein:

the touch processor calculates the phase differences in comparison to the reference signal from a total value of digital values converted by a predetermined pressure detecting sampling number in a portion of a signal corresponding to a pressure detecting section, with respect to each of the pressure detecting reception signals received through the antenna, and the touch processor detects the pressure of the pen touching the screen based on the phase difference calculated according to each of the pressure detecting reception signals received through the antenna.

5. The touch sensing system of claim 4, wherein:

the touch processor sets the pressure detecting sampling number with respect to each of the pressure detecting reception signals received through the antenna, and the pressure detecting sampling number increases in correspondence to a decrease of a number of the sensor node for detecting the pressure in comparison to a number of the sensor node for detecting the coordinate, when the touch processor calculates the phase difference in comparison to the reference signal with respect to each of the pressure detecting reception signals received through the antenna.

6. The touch sensing system of claim 1, wherein the antenna is disposed at an edge area of the touch screen panel, or the antenna is disposed on an outside of the touch screen panel.

7. The touch sensing system of claim 1, wherein the touch screen panel is attached on a display panel, or the touch screen panel is included in the display panel in an on cell type or an in cell type.

8. A touch sensing system comprising:

a touch screen panel including a screen and first lines and second lines disposed in crossing directions in a non-loop shape;

an antenna having a loop shape disposed in a peripheral area of the first lines and the second lines; and a touch processor including a line driving unit, an antenna receiving unit, and a controller controlling the line driving unit and the antenna receiving unit to perform a touch process, the touch processor configured to:

sense a touch on the screen based on a signal received through a sensing line by applying a driving pulse through a driving line, according to a type of a touch mode, when the touch mode is a finger touch mode, control to operate one of the first lines and the second lines as the driving line and operate another of the first lines and the second lines as the sensing line, and when the touch mode is a pen touch mode, control to operate both of the first lines and the second lines as the driving line and operate the antenna as the sensing line to receive a resonance signal of a pen touching the screen, wherein the resonance signal is generated from the pen touching the screen according to a provision of sequential driving pulses to each of the first and second lines by the line driving unit, wherein the antenna operates as a sensing line to receive the resonance signal of the pen touching the screen and provides the resonance signal to the antenna receiving unit for the controller to perform the touch process, and wherein the first lines and the second lines operate as driving lines to receive a driving signal.

9. The touch sensing system of claim 8, wherein the antenna is disposed at an edge area of the touch screen panel.

10. The touch sensing system of claim 8, wherein the antenna is disposed outside the touch screen panel.

11. The touch sensing system of claim 8, wherein the touch screen panel is attached on a display panel.

12. The touch sensing system of claim 8, wherein the touch screen panel is included in a display panel in an on cell type or an in cell type.

13. A display apparatus comprising:

a display screen;

a touch sensor including first lines and second lines disposed in crossing directions in a non-loop shape, and an antenna having a loop shape disposed in a peripheral area of the first lines and the second lines; and a touch processor including a line driving unit, an antenna receiving unit, and a controller controlling the line driving unit and the antenna receiving unit to perform a touch process, the touch processor configured to:

perform a first touch process by receiving a first signal with respect to driving pulses applied to each of the first lines and the second lines, through the antenna, wherein the first touch process is a process for detecting a coordinate of a point where a pen touches the display screen, and using the detected coordinate of the point, perform a second touch process by sequentially applying the driving pulses to each of two or more selected lines among the first lines and the second lines and by receiving a second signal through the antenna, wherein the second touch process is a process for detecting a pressure of the pen touching the display screen, wherein the antenna operates as a sensing line to receive the first and second signals and provides the first and second signals to the antenna receiving unit for the controller to perform the touch process for detecting the coordinate of the point touched by the pen and the pressure of the pen touching the display screen, wherein the first and second signals are generated from the pen touching the display screen according to a provision of the driving pulses by the line driving unit, and wherein the first lines and the second lines operate as driving lines to receive a driving signal.

14. The display apparatus of claim 13, wherein the display screen is a touch screen panel attached on a display panel.

15. The display apparatus of claim 13, wherein the display screen is a touch screen panel, and is included in a display panel in an on cell type or an in cell type.

* * * * *